US008366950B2

(12) United States Patent
Chida et al.

(10) Patent No.: US 8,366,950 B2
(45) Date of Patent: Feb. 5, 2013

(54) LIQUID-EJECTION HEAD AND METHOD FOR MANUFACTURING LIQUID-EJECTION HEAD SUBSTRATE

(75) Inventors: Mitsuru Chida, Yokohama (JP); Toshiyasu Sakai, Oita (JP); Noriyasu Ozaki, Atsugi (JP); Hiroyuki Abo, Chigasaki (JP); Kazuya Abe, Tokyo (JP); Kenji Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 12/204,802

(22) Filed: Sep. 5, 2008

(65) Prior Publication Data

US 2009/0065474 A1 Mar. 12, 2009

(30) Foreign Application Priority Data

Sep. 6, 2007 (JP) ................................ 2007-231356

(51) Int. Cl.
*G01D 15/00* (2006.01)

(52) U.S. Cl. .............................. 216/27; 216/37; 347/61

(58) Field of Classification Search .................... 216/27, 216/37; 347/61
See application file for complete search history.

(56) References Cited

U.S. PATENT DOCUMENTS

| | | | | |
|---|---|---|---|---|
| 4,325,182 | A | 4/1982 | Tefft | |
| 6,107,209 | A | 8/2000 | Ohkuma | |
| 6,143,190 | A * | 11/2000 | Yagi et al. | 216/27 |
| 6,563,079 | B1 * | 5/2003 | Umetsu et al. | 219/121.71 |
| 6,805,432 | B1 | 10/2004 | Milligan | |
| 7,250,113 | B2 | 7/2007 | Komuro | |
| 7,322,104 | B2 | 1/2008 | Koyama | |
| 2005/0285905 | A1 * | 12/2005 | Koyama et al. | 347/61 |

FOREIGN PATENT DOCUMENTS

| | | |
|---|---|---|
| JP | 57-089225 | 6/1982 |
| JP | H03-253025 | 11/1991 |
| JP | H11-001000 | 1/1999 |
| JP | 2006-035854 | 2/2006 |
| WO | 00/50198 | 8/2000 |

* cited by examiner

*Primary Examiner* — Duy Deo
*Assistant Examiner* — Maki Angadi
(74) *Attorney, Agent, or Firm* — Canon USA Inc IP Division

(57) ABSTRACT

A method for manufacturing a liquid-ejection head substrate including a silicon substrate having a supply port for supplying liquid is provided. The method includes: forming an etching mask layer on a surface of the silicon substrate, the etching mask layer having an opening in a portion corresponding to the supply port; forming a first recess in the surface of the silicon substrate by anisotropically etching the silicon substrate through the opening in the etching mask layer; forming a second recess that extends toward the other surface of the silicon substrate, in a surface of the first recess in the silicon substrate; and forming the supply port by anisotropically etching the silicon substrate from the surface provided with the second recess.

3 Claims, 6 Drawing Sheets

LIQUID-EJECTION HEAD AND METHOD FOR MANUFACTURING LIQUID-EJECTION HEAD SUBSTRATE

BACKGROUND OF THE INVENTION

1. Field of the Invention

The present invention relates to a liquid-ejection head for ejecting liquid, and a method for manufacturing a liquid-ejection head substrate used in a liquid-ejection head.

2. Description of the Related Art

An inkjet recording head used in inkjet recording is an exemplary liquid-ejection head for ejecting liquid.

U.S. Pat. No. 6,143,190 discloses a method for forming, by anisotropic etching, an ink supply port that is in communication with and supplies liquid to a liquid chamber having ejection-energy generating portions for generating heat energy for jetting droplets from ejection orifices. U.S. Pat. No. 6,143,190 also discloses a method for precisely forming an ink supply port, using a sacrifice layer. U.S. Pat. No. 6,143,190 discloses the role served by the sacrifice layer during precise etching, for example, in FIGS. 1 to 3 and the description of the first embodiment related to these figures. U.S. Pat. No. 7,250,113 discloses a method for simplifying steps while performing precise etching, by simultaneously performing a step of forming a sacrifice layer and another step.

These ink supply ports are formed by anisotropically etching a silicon (Si) substrate having a <100> plane orientation, using an alkaline solution. This method utilizes the difference in dissolution rate in an alkaline solution among plane orientations. More specifically, etching progresses while leaving a <111> plane, whose dissolution rate is extremely low.

FIG. 7 is a schematic sectional view showing an exemplary ink supply port formed by using a known sacrifice layer and anisotropic etching process. FIG. 7 shows a Si substrate 51, a portion 52 where a sacrifice layer existed, an etching stop layer 54, an etching mask 58, and <111> planes 55 of the Si substrate. As shown in FIG. 7, the <111> planes 55 have a slope of 54.7° with respect to the back surface of the Si substrate 51. Thus, when a through-opening is formed in the Si substrate 51 having a thickness T using a known Si anisotropic etching process, for example, a surface subjected to etching needs to have a width of at least (2 T/tan 54.7°), geometrically. This is an obstacle to a reduction in size of chips or processing in a back-end process, such as a die bonding step, of chips.

U.S. Pat. No. 6,107,209 discloses a method that solves the above-described problem, in which anisotropic etching is performed after heat treatment of a Si substrate. According to the method, an ink supply port having a barrel-shaped cross section is formed, in which the processing width of <111> planes increases to a desired height from the back surface of the Si substrate, and then the processing width of <111> planes decreases.

U.S. Pat. No. 6,805,432 discloses a method for forming an ink supply port having a barrel-shaped cross section, in which anisotropic etching is performed after dry etching.

However, the shapes of ink supply ports (the positions of the bulges of barrel shapes) that can be formed according to the method for forming an ink supply port having a barrel-shaped cross section, disclosed in U.S. Pat. No. 6,107,209, are limited for a processing reason. If there is any defect in the crystal structure of a Si substrate, the state of progress of etching is changed at the defect portion, thereby making it impossible to obtain an ink supply port having a desired shape. Thus, it is difficult to stably form desired ink supply ports regardless of the crystal structure of Si substrates.

Further, a load in the manufacturing process is heavy in the method for forming an ink supply port having a barrel-shaped cross section, disclosed in U.S. Pat. No. 6,805,432. More specifically, a dry etching step for forming a deep groove in a Si substrate takes long time. Moreover, because there are pre- and post-dry etching steps, such as application, exposure, development, and removal steps, time and effort for these steps are required.

SUMMARY OF THE INVENTION

The present invention provides a method for manufacturing a liquid-ejection head substrate, which enables liquid-ejection head substrates to be stably manufactured with accuracy of form and high manufacturing efficiency.

According to an aspect of the present invention, a liquid-ejection head of the invention includes a silicon substrate having a supply port for supplying liquid, and a method for manufacturing the liquid-ejection head includes: providing a silicon substrate having an etching mask layer on a surface thereof, the etching mask layer having an opening in a portion corresponding to the supply port; forming a first recess in the surface of the silicon substrate by anisotropically etching the silicon substrate through the opening in the etching mask layer; forming a second recess including an opening in a part of a surface of the first recess, such that the opening extends toward the other surface of the silicon substrate, which is the surface opposite the surface of the silicon substrate; and forming the supply port by anisotropically etching the silicon substrate from the surface provided with the second recess.

Further features of the present invention will become apparent from the following description of exemplary embodiments with reference to the attached drawings.

DESCRIPTION OF THE EMBODIMENTS

Figure 1:
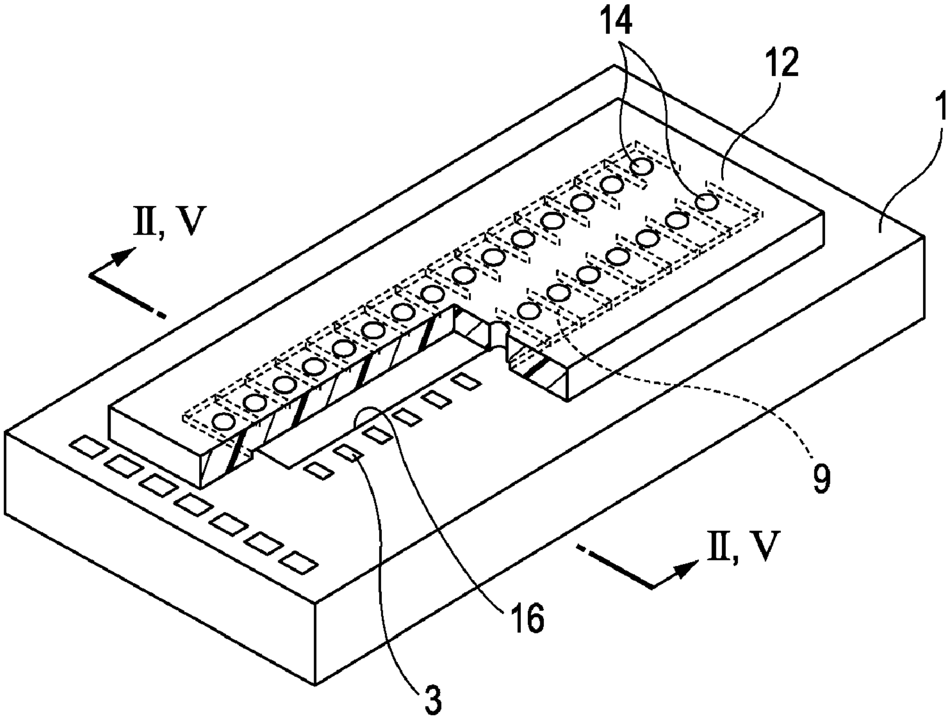
FIG. 1 is a perspective view of a part of an inkjet recording head according to an embodiment of the invention.

An embodiment of the invention will now be described with reference to the drawings. In the following description, like reference numerals refer to like parts throughout the various views, and the explanations thereof are occasionally omitted.

Although an inkjet recording head is described as an exemplary liquid-ejection head to which the invention is applied in the following description, the scope of application of the liquid-ejection head of the invention is not limited thereto, and the invention is applicable to fabrication of biochips, printing of electronic circuits, and the like.

First, an inkjet recording head (hereinafter also referred to as a "recording head") to which the invention is applicable is described.

FIG. 1 is a schematic view of a recording head according to an embodiment of the invention.

The inkjet recording head has a Si substrate 1 having ink-discharging-energy generating elements 3 arranged in two lines at a predetermined pitch. A polyetheramide layer (not shown) serving as a contact layer is deposited on the Si substrate 1, and a coating photopolymer 12 having flow-path side walls 9 and ink ejection orifices 14 that open above the ink-discharging-energy generating elements 3 is formed thereon. The coating photopolymer 12 constitutes an upper portion of the ink flow paths in communication with an ink supply port 16 and the ink ejection orifices 14. The ink supply port 16, which is formed by anisotropically etching the Si substrate 1 using a silicon dioxide ($SiO_2$) film as a mask, opens between the two lines of the ink-discharging-energy generating elements 3. The inkjet recording head performs recording by applying pressure generated by the ink-discharging-energy generating elements 3 to ink (liquid) filled in the ink flow paths through the ink supply port 16, to cause ink droplets to be ejected from the ink ejection orifices 14 and deposited on a recording medium.

The inkjet recording head can be mounted on an apparatus such as a printer, a copier, a facsimile having a communication system, or a word processor having a printer unit. The inkjet recording head can also be mounted on an industrial recording apparatus used in combination with various processing apparatuses. The inkjet recording head enables recording on various recording media including paper, thread, fiber, leather, metal, plastic, glass, wood, and ceramic. Herein, the term "recording" means not only forming an image having a meaning, such as a letter or a figure, on a recording medium, but also forming an image having no meaning, such as a pattern, on a recording medium.

Characteristics of Anisotropic Etching Using Leading Hole

Figure 2:
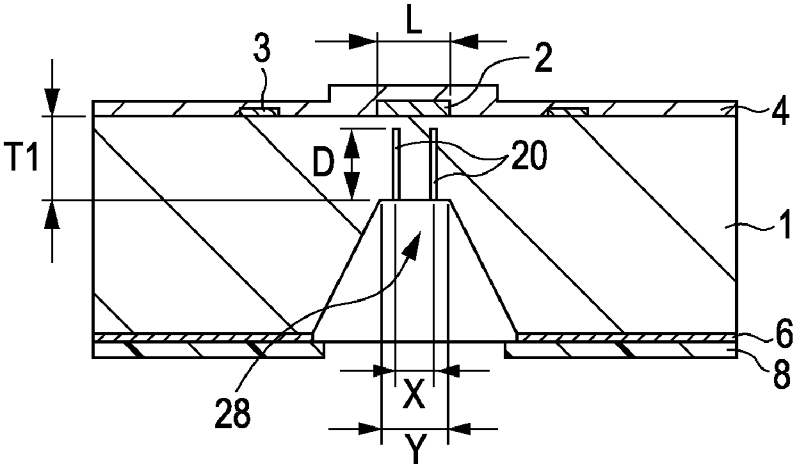
FIG. 2 is a sectional view of an inkjet recording head substrate to which a manufacturing method according to an embodiment of the invention is applied.

FIG. 2 is a sectional view of an inkjet recording head substrate to which a manufacturing method according to the present embodiment is applied. FIG. 2 is a sectional view taken along line II, V-II, V in FIG. 1. FIG. 2 shows a sacrifice layer 2, an etching stop layer (passivation layer) 4, the Si substrate 1, an etching mask layer 8 for anisotropic etching, and leading holes 20.

In the present embodiment, first, the Si substrate 1 having the etching mask layer 8 on the back surface is anisotropically etched to a desired pattern depth to form a first recess 28, where a <100> crystal orientation plane is exposed. Next, leading holes (blind holes) 20 serving as second recesses, which extend to positions just before the sacrifice layer 2, are formed in the first recess 28. Finally, anisotropic etching is performed to allow the leading holes 20 to reach the sacrifice layer 2 and penetrate the Si substrate 1. In the present embodiment, it is possible to form the leading holes 20 that extend to positions just before the sacrifice layer 2, because the leading holes 20 are formed after the first recess 28 is formed in the Si substrate 1. By forming the leading holes 20 that extend to positions just before the sacrifice layer 2, as the present embodiment, the possibility of occurrence of etching failure due to a possible internal defect of the Si substrate 1 can be reduced. Accordingly, this enables inkjet recording head substrates and inkjet recording heads to be stably and efficiently manufactured, regardless of the internal crystal structure of the Si substrate 1.

In the present embodiment, as shown in FIG. 2, the leading holes 20 serving as the second recesses are formed in the first recess 28 formed in a region where the ink supply port 16 is to be formed, in the Si substrate 1, in such a manner that at least two leading holes 20 are formed in the transverse direction of the ink supply port 16. It is desirable that the leading holes 20 be arranged along two lines in the longitudinal direction of the ink supply port 16 (the direction penetrating the paper) in the region where the ink supply port 16 is to be formed, in the Si substrate 1, symmetrically with respect to the center line of the ink supply port 16. Although the leading holes 20 are arranged in two lines in the embodiment disclosed herein, the leading holes 20 may be arranged in three or more lines.

FIGS. 3A to 3D schematically show a process of crystal anisotropic etching performed on the Si substrate having the leading holes as shown in FIG. 2.

Figure 3A:
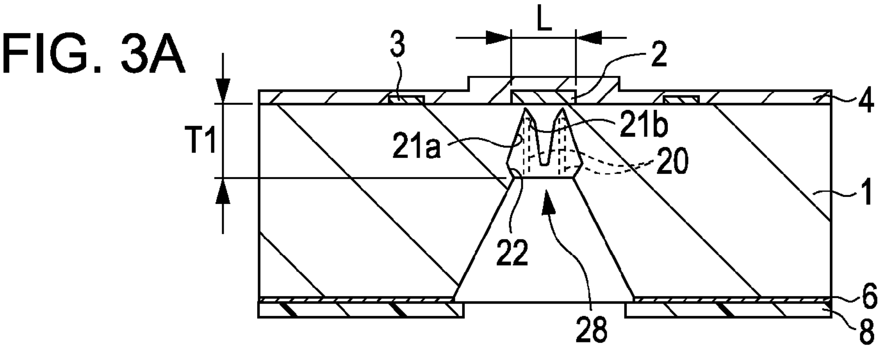
FIGS. 3A to 3D show a method for manufacturing an inkjet recording head substrate according to an embodiment of the invention.

First, <111> planes 21a and 21b are formed for each of the leading holes 20, in such a manner that the distance between the <111> planes 21a and 21b decreases in the direction from the end of the leading hole 20 adjacent to the back surface of the Si substrate 1 to the surface of the Si substrate 1. At the same time, etching progresses from the inside of the leading holes 20 in a direction perpendicular to the thickness direction of the Si substrate 1 (in the left-right direction in FIGS. 3A to 3D). Further, <111> planes 22 are formed in the first recess 28 formed in the back surface of the Si substrate 1, where the <100> plane is exposed, in such a manner that the distance between the <111> planes 22 increases toward the surface of the Si substrate 1 (FIG. 3A).

Figure 3B:
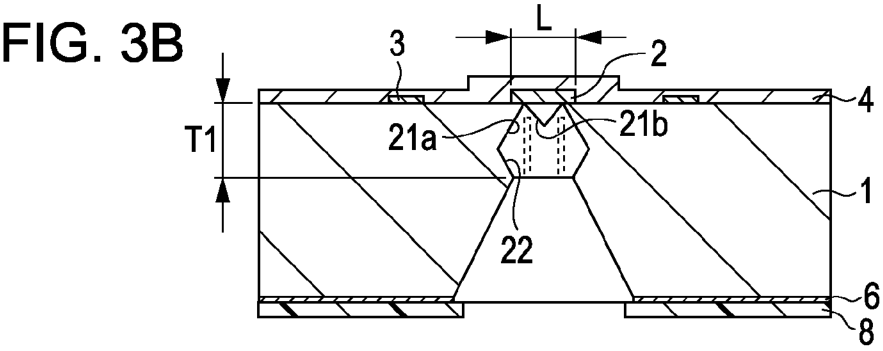

When etching progresses further, the <111> planes 21b of the leading holes 20 meet each other at a position between the leading holes 20. Then, the top portion formed by these <111> planes 21b is etched further toward the surface of the Si substrate 1. Further, the <111> planes 21a constituting the outer planes of the leading holes 20 meet the <111> planes 22 that extend from the opening in the Si substrate 1, where the <100> plane was exposed. Thus, etching in the direction perpendicular to the thickness direction of the Si substrate 1 apparently stops (FIG. 3B).

Figure 3C:
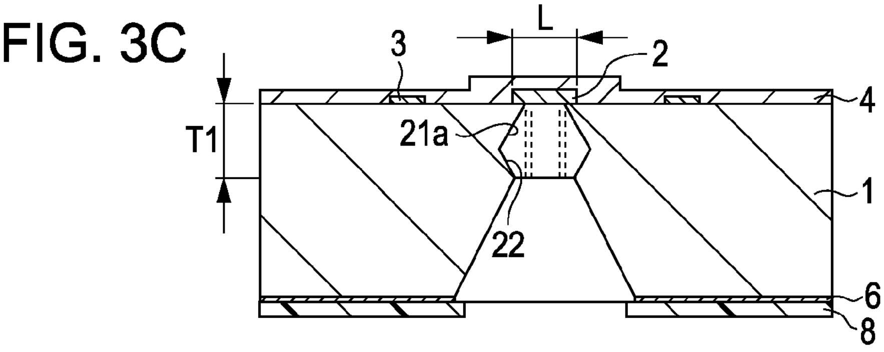
Figure 3D:
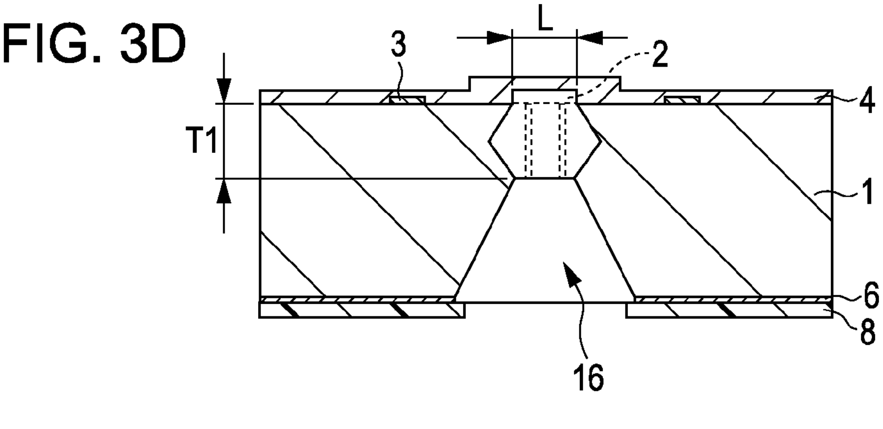

When etching progresses further, a <100> plane is formed between the two leading holes 20 (FIG. 3C). As etching progresses, the <100> plane approaches the surface of the Si substrate 1, and finally, reaches the sacrifice layer 2. Thus, anisotropic etching is completed (FIG. 3D).

As shown in FIGS. 3A to 3D, the ink supply port 16 according to the present embodiment has such a shape that the width in the transverse direction of the ink supply port 16 gradually decreases from the opening of the ink supply port 16 formed in the back surface of the Si substrate 1 to a first depth position of the Si substrate 1 (the position where the deepest portion of the first recess 28 existed originally), then gradually increases from the first depth position in the direction of the surface of the Si substrate 1 to a second depth position, which is the bulge of the barrel-shaped section, and gradually decreases from the second depth position to the surface of the Si substrate 1.

In the above-described method for forming the ink supply port 16, the positions where the <111> planes 21a are formed, the distance therebetween decreasing toward the surface of the Si substrate 1, are determined by the positions of the leading holes 20. The positions where the <111> planes 22 are formed, the distance therebetween increasing from the <100> plane exposed at the first recess 28 formed in the back surface of the Si substrate 1 toward the surface of the Si substrate 1, are determined by the position where the <100> plane is exposed by anisotropic etching.

Let us assume that, as shown in FIG. 2, L denotes the width of the sacrifice layer 2 in the transverse direction (the distance between both ends of the sacrifice layer 2 in the transverse direction), T1 denotes the thickness from the surface of the Si substrate 1 to the <100> plane of the first recess 28, X denotes the distance between two lines of the leading holes 20, i.e., the distance between the leading holes 20 (blind holes) positioned at both ends of the first recess 28 in the transverse direction, and D denotes the depth of the leading holes 20.

In the above-described progress process of etching, in order to allow the ink supply port 16 to reach the sacrifice layer 2 by anisotropically etching the back surface of the Si substrate 1, it is desirable that the depth D of the leading holes 20 satisfy the following relationship:

$$T1-(X/2-L/2)\times\tan 54.7°\geqq D\geqq T1-X/2\times\tan 54.7° \quad \text{[Expression 1]}$$

Further, in order to form the ink supply port 16 having a barrel-shaped cross section as described above, it is desirable that the distance X between the leading holes 20 at both ends of the first recess 28 in the transverse direction and the width Y of the <100> plane in the transverse direction, exposed at the first recess 28, satisfy the following relationship:

$$(T1/\tan 54.7°)+L>Y>X \quad \text{[Expression 2]}$$

If the width Y of the <100> plane in the transverse direction, exposed at the first recess 28, is larger than (T1/tan 54.7°)+L, an ink supply port having <111> planes, the distance therebetween decreasing in the direction from the back surface to the surface of the Si substrate 1, is undesirably formed.

Thus, the manufacturing method according to the present embodiment allows the processing pattern and the depth D of the leading holes 20, and the thickness T1 from the surface of the Si substrate 1 to the <100> plane of the first recess 28 to be changed. Accordingly, various barrel-shaped ink supply ports may be formed.

Figure 4:
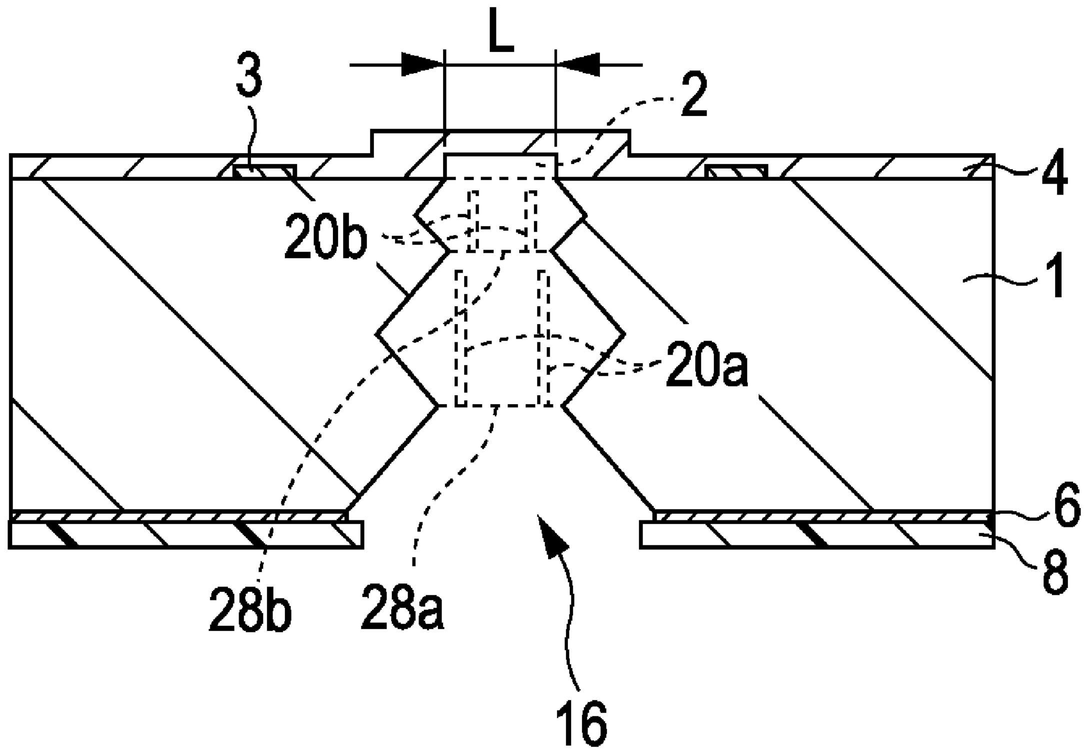
FIG. 4 is a sectional view showing a modification example an inkjet recording head substrate according to an embodiment of the invention.

FIG. 4 is a sectional view of an inkjet recording head substrate formed by applying the manufacturing method shown in FIGS. 3A to 3D.

In the example shown in FIG. 4, first, the first recess 28, whose depth to a <100> plane 28*a* is smaller than that shown in FIGS. 3A to 3D, is formed in the back surface of the Si substrate 1. Second, leading holes 20*a* arranged in two lines are formed in the <100> plane 28*a*, and anisotropic etching is performed to form a first barrel-shaped portion having a <100> plane 28*b* adjacent to the surface of the Si substrate 1. Finally, leading holes 20*b* arranged in two lines are formed in the <100> plane 28*b*, and anisotropic etching is performed until the <100> plane 28*b* reaches the sacrifice layer 2 to form a second barrel-shaped portion. Thus, the ink supply port 16 having two barrel-shaped portions as shown in FIG. 4 is formed. The number of barrel-shaped portions formed in the ink supply port 16 is not limited to one as shown in FIGS. 3A to 3D or two as shown in FIG. 4, but it may be three or more.

A method for manufacturing an inkjet recording head, to which the above-described method for manufacturing an inkjet recording head substrate is applied, is described below with reference to FIGS. 5A to 5D, and FIGS. 5E to 5H. The invention is not limited to the embodiment disclosed below, but may be applied to the other techniques that fall within the scope of the concept of the present invention disclosed in the claims.

FIGS. 5A to 5D and FIGS. 5E to 5H are the sectional views taken along line II, V-II, V in FIG. 1.

Figure 5A:
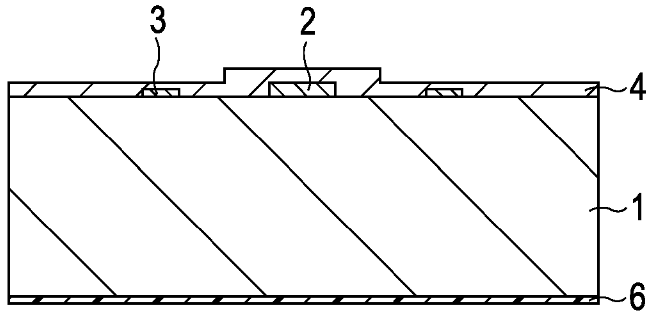
FIGS. 5A to 5D show a method for manufacturing an inkjet recording head to which the method shown in FIGS. 3A to 3D is applied.

The ink-discharging-energy generating elements 3, such as heat elements, are disposed on the surface of the Si substrate 1 as shown in FIG. 5A. The back surface of the Si substrate 1 is entirely covered by a $SiO_2$ film 6. The sacrifice layer 2, which will be dissolved in an alkaline solution during formation of the ink supply port 16 is formed on the surface of the Si substrate 1. Wires and semiconductor elements for driving the ink-discharging-energy generating elements 3 are not shown. The sacrifice layer 2 is made of a material etchable by an alkaline solution. Examples of such a material include polysilicon, and aluminum-containing materials such as aluminum, aluminum-silicon, aluminum-copper, and aluminum-silicon-copper, which are rapidly etched. However, the material of the sacrifice layer 2 is not limited to those mentioned above, and a material that is more rapidly etched by an alkaline solution than silicon may be properly chosen. The etching stop layer (passivation layer) 4 needs to stop the progress of etching by an alkaline solution, after the sacrifice layer 2 is exposed by anisotropic etching of the Si substrate 1. It is desirable that, for example, the etching stop layer 4 is composed of a heat storage layer that is composed of silicon oxide and positioned below the ink-discharging-energy generating elements 3, or a protective film that is composed of silicon nitride and positioned above the ink-discharging-energy generating elements 3.

Figure 5B:
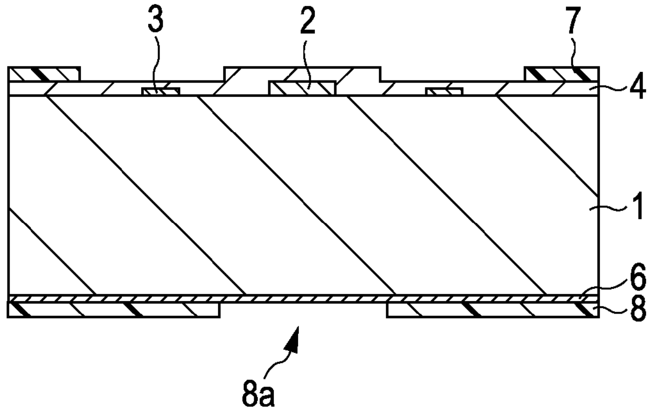

Next, as shown in FIG. 5B, polyetheramide resin layers 7 and 8 are formed on the surface and back surface of the Si substrate 1, respectively, and cured in a bake step. Then, to pattern the polyetheramide resin layer 7, a positive resist (not shown) is applied to the surface of the Si substrate 1 using a spin coat method or the like, then exposed and developed. The polyetheramide resin layer 7 is then patterned by dry etching or the like, and the positive resist is removed. Similarly, to pattern the polyetheramide resin layer 8, a positive resist (not shown) is applied to the back surface of the substrate 1 using a spin coat method or the like, and exposed and developed. The polyetheramide resin layer 8 is then patterned by dry etching or the like, and the positive resist is removed. The etching mask layer made of the polyetheramide resin layer 8 has an opening 8*a* in a portion corresponding to the portion where the ink supply port 16 is formed.

Figure 5C:
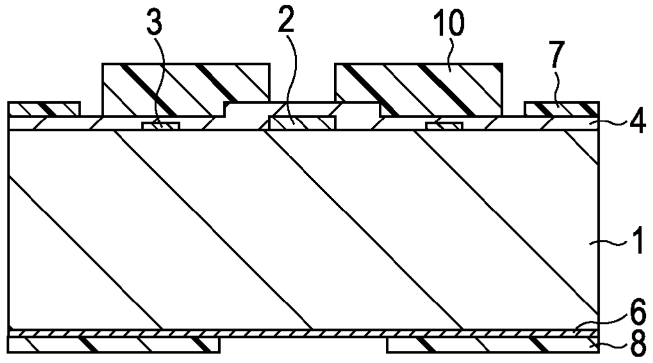

Then, as shown in FIG. 5C, a positive resist 10, which is a shaped material occupying the portion constituting the ink flow paths, is patterned on the surface of the Si substrate 1.

Figure 5D:
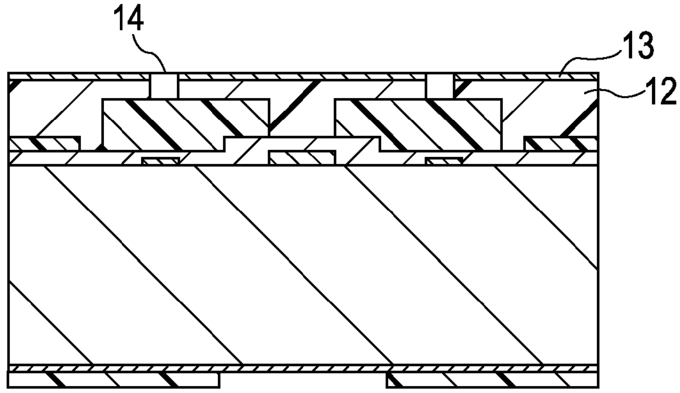

Thereafter, as shown in FIG. 5D, the coating photopolymer 12 that constitutes a nozzle forming member is formed on the positive resist 10, using a spin coat method or the like. Further, the coating photopolymer 12 is covered by a water-repellent material 13 by laminating a dry film, or the like method. The coating photopolymer 12 is exposed to ultraviolet (UV) rays, deep UV rays, or the like, then developed and patterned to form the ink ejection orifices 14 in the coating photopolymer 12.

Figure 5E:
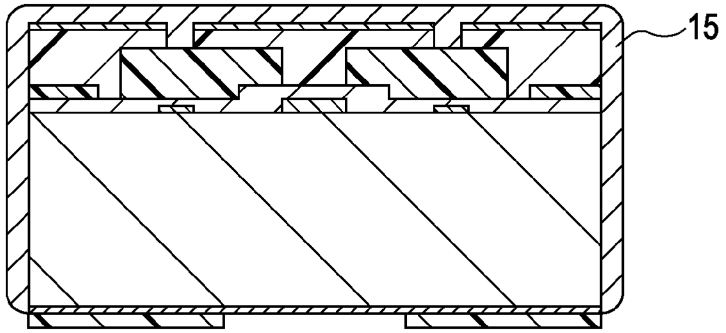
FIGS. 5E to 5H show a method for manufacturing an inkjet recording head to which the method shown in FIGS. 3A to 3D is applied.

Next, as shown in FIG. 5E, the surface of the Si substrate 1, where the positive resist 10 and the coating photopolymer 12 are formed, and the side surfaces of the Si substrate 1 are covered by a protective material 15 by a spin coat method or the like.

Figure 5F:
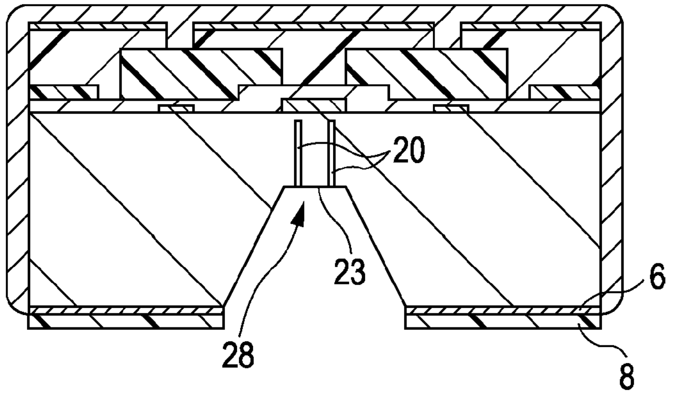

Then, as shown in FIG. 5F, the ink supply port 16 is formed in the back surface of the Si substrate 1. First, the $SiO_2$ film 6 positioned in the region where the first recess 28 in the back surface of the Si substrate 1 is to be formed is removed through the opening 8*a* provided in the etching mask layer 8. Then, using a tetramethyl ammonium hydroxide (TMAH) solvent as an anisotropic etchant, the etching surface of the Si substrate 1 is etched from the back surface. Thus, the first recess 28 having a desired depth is formed, where a <100> crystal orientation plane 23 is exposed. Next, the leading holes 20 that extend from the back surface toward the surface of the Si substrate 1 are formed by laser processing. The leading holes 20 are provided such that openings are formed in a part of the <100> crystal orientation plane 23. At this time, a laser beam with a frequency three times as high as the frequency of the YAG laser (THG: wavelength 355 nm) is used to form the leading holes 20, while the power and frequency of the laser beam are properly set. The diameter of the leading holes 20 is desirably about 5 μm to 100 μm. A too small diameter of the leading holes 20 hinders etchant from entering the leading holes 20 during the subsequent anisotropic etching. A too large diameter of the leading holes 20 takes time to form the leading holes 20 having a desired depth. If the diameter of the leading holes 20 is increased, the processing pitch needs to be set accordingly so that adjoining leading holes 20 do not contact each other.

Figure 6:
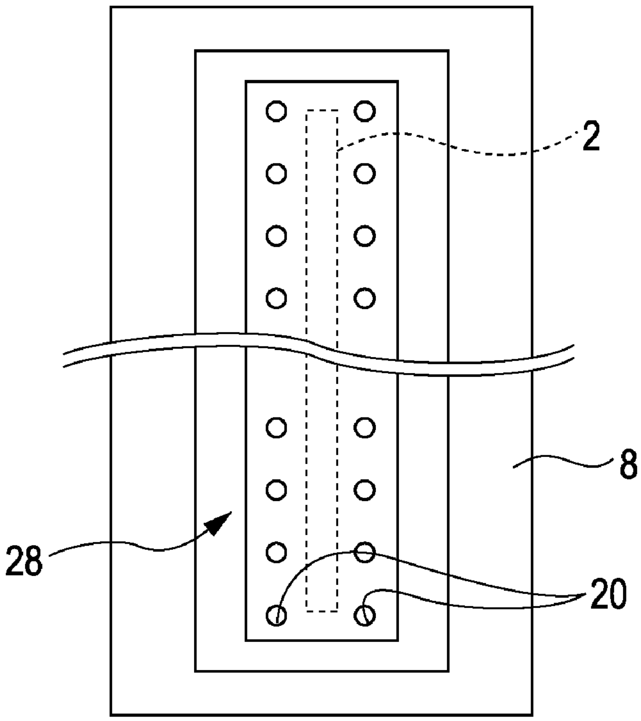
FIG. 6 is a plan view of a back surface of the substrate having leading holes formed in the step shown in FIG. 5F.
Figure 7:
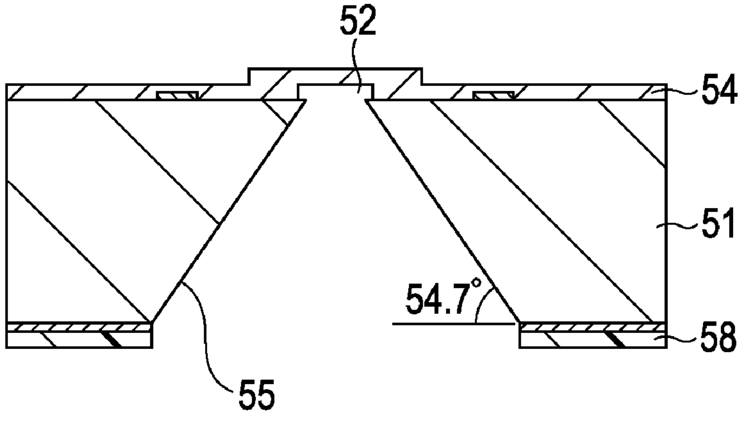
FIG. 7 PRIOR ART
FIG. 7 is a schematic sectional view showing an exemplary ink supply port formed using a known sacrifice layer and anisotropic etching process.

FIG. 6 is a plan view of the back surface of the Si substrate 1 having the leading holes 20 formed in the step shown in FIG. 5F. The <100> plane of the first recess 28 is provided at the position corresponding to the sacrifice layer 2 (indicated by the dashed line in FIG. 6) formed on the surface of the Si substrate 1.

Although the laser beam, which is the third harmonic generation wave (THG: wavelength 355 nm) of the YAG laser, is used to form the leading holes 20 in the present embodiment, as long as the laser beam has a wavelength sufficient to bore a hole in silicon, which is the material of the substrate 1, the laser beam is not limited thereto. For example, the leading holes 20 may be formed using the second harmonic generation wave (SHG: wavelength 532 nm) of the YAG laser, because the SHG is highly absorbed by silicon, similarly to the THG. Alternatively, the fundamental wave of the YAG laser (wavelength 1064 nm) may be used.

Figure 5G:
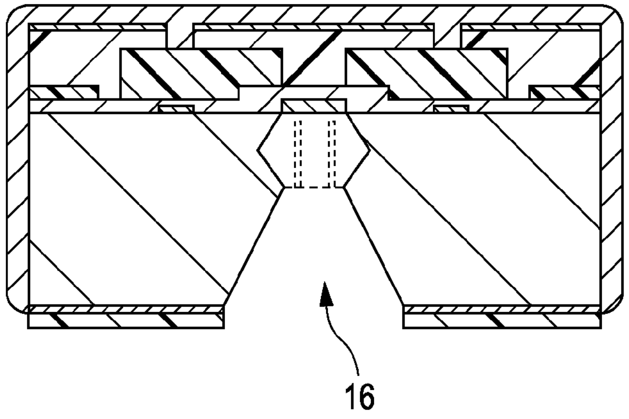

Then, as shown in FIG. 5G, the back surface of the silicon substrate 1 is etched to form the ink supply port 16 that extends to the sacrifice layer 2, using a TMAH solvent as an anisotropic etchant. Etching progresses according to the process described with reference to FIGS. 3A to 3D, and the <111> planes having a slope of 54.7° with respect to the back surface of the Si substrate 1 reach the sacrifice layer 2, at the ends of the leading holes 20. The sacrifice layer 2 is isotropically etched by an etchant, whereby the upper end of the ink supply port 16 is formed in the shape of the sacrifice layer 2. The ink supply port 16 is formed to have a barrel-shaped cross section taken along line II, V-II, V in FIG. 1, with the <111> planes being exposed. Thus, by allowing the <111> planes to be exposed in the ink supply port 16, the effect of preventing silicon from being eluted from the Si substrate 1 into ink flowing in the ink supply port 16 is expected.

Figure 5H:
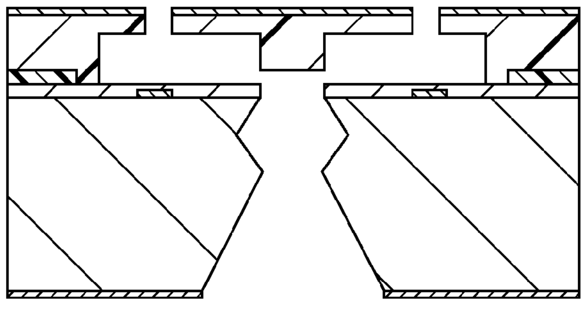

Finally, as shown in FIG. 5H, a portion of the etching stop layer 4, which covers the opening of the ink supply port 16, is removed by dry etching. Then, the polyetheramide resin layer 8 and the protective material 15 are removed. Then, the positive resist 10 is dissolved and drained through the ink ejection orifices 14 and the ink supply port 16, whereby the ink flow paths and a foaming chamber is formed.

After going through the above-described steps, the Si substrate 1 having nozzle portions is completed. The Si substrate 1 is cut into chips using a dicing saw or the like. Then, in each chip, electrical wires for driving the ink-discharging-energy generating elements 3 are bonded. Thereafter, a chip tank member for supplying ink is connected to the chip. Thus, an inkjet recording head is completed.

Although the Si substrate 1 according to the present embodiment has a thickness of 600 μm, the manufacturing method of the invention may be applied to a substrate having a thickness smaller or larger than 600 μm.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-231356 filed Sep. 6, 2007, which is hereby incorporated by reference herein in its entirety.

What is claimed is:

1. A method for manufacturing a liquid-ejection head substrate including a silicon substrate having a supply port for supplying liquid, the method comprising:

providing a silicon substrate having an etching mask layer on a first surface thereof, the etching mask layer having an opening in a portion corresponding to the supply port;

forming a first recess, where a <100> plane is exposed in the first surface of the silicon substrate by anisotropically etching the silicon substrate through the opening in the etching mask layer;

forming a second recess by irradiating the exposed <100> plane with a laser beam from the first surface side in a part of the exposed <100> plane of the first recess, the second recess extending toward a second surface of the silicon substrate, which is a surface opposite the first surface of the silicon substrate; and forming the supply port by anisotropically etching the silicon substrate from the second recess.

2. The method according to claim 1, wherein the second recess is provided in a plurality, the second recesses being arranged in at least two lines extending in a longitudinal direction of the first recess, symmetrically with respect to a center line extending in the longitudinal direction of the first recess.

3. The method according to claim 1, wherein the second surface of the silicon substrate has an energy generating element that generates energy for ejecting liquid.

* * * * *